(12) United States Patent
Koizumi

(10) Patent No.: US 8,947,851 B2
(45) Date of Patent: Feb. 3, 2015

(54) LAMINATED CERAMIC CAPACITOR

(75) Inventor: Yoshio Koizumi, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 46 days.

(21) Appl. No.: 13/442,662

(22) Filed: Apr. 9, 2012

(65) Prior Publication Data
US 2012/0262840 A1    Oct. 18, 2012

(30) Foreign Application Priority Data

Apr. 18, 2011    (JP) ................................. 2011-092111

(51) Int. Cl.
H01G 4/06    (2006.01)
H01G 4/12    (2006.01)

(52) U.S. Cl.
CPC ........... *H01G 4/1227* (2013.01); *H01G 4/1209* (2013.01)
USPC ..................................... 361/321.2; 361/301.4

(58) Field of Classification Search
None
See application file for complete search history.

(56) References Cited

U.S. PATENT DOCUMENTS

| | | | |
|---|---|---|---|
| 4,574,329 A * | 3/1986 | Eijkelenkamp et al. ... | 361/321.2 |
| 7,089,659 B2 * | 8/2006 | Iwaida et al. ................... | 29/830 |
| 7,573,697 B2 * | 8/2009 | Sato et al. ................... | 361/306.1 |
| 7,644,480 B2 * | 1/2010 | Kim et al. ..................... | 29/25.42 |
| 2011/0141660 A1 * | 6/2011 | Jeong et al. ................ | 361/321.4 |
| 2012/0154978 A1 | 6/2012 | Kim | |

FOREIGN PATENT DOCUMENTS

| | | |
|---|---|---|
| JP | 2011-023707 A1 | 2/2011 |
| JP | 2012-129494 A1 | 7/2012 |
| KR | 101141434 B1 | 5/2012 |

OTHER PUBLICATIONS

Notification of Reasons for Refusal issued by the Japanese Patent Office, mailed Mar. 19, 2013, for Japanese counterpart application No. 2011-092111.
Korean Office Action issued by the Korean Patent Office, mailed Jul. 17, 2013, for Korean counterpart application No. 10-2012-0012278.
A Notification of First Office Action with Search Report issued by the State Intellectual Property Office of China, mailed Jul. 30, 2014, for Chinese counterpart application No. 201210114266.X.

* cited by examiner

*Primary Examiner* — Dion R Ferguson
(74) *Attorney, Agent, or Firm* — Law Office of Katsuhiro Arai

(57) ABSTRACT

The laminated ceramic capacitor has a laminate block made of alternately laminated ceramic dielectric layers and internal electrodes, a pair of cover layers, laminated on top and bottom of the laminate block, ceramic bodies formed on both side faces of the laminate block, and a pair of external electrodes that are electrically connected to the internal electrodes, wherein the average grain size of the ceramic dielectric grains constituting the ceramic body is smaller than the average grain size of the ceramic dielectric grains constituting the ceramic dielectric layer in the laminate block.

5 Claims, 3 Drawing Sheets

LAMINATED CERAMIC CAPACITOR

BACKGROUND

1. Field of the Invention

The present invention relates to a laminated ceramic capacitor, and more specifically to a laminated ceramic capacitor offering improved strength and moisture resistance and being capable of effectively preventing generation of cracks caused by thermal shock.

2. Description of the Related Art

A laminated ceramic capacitor is normally produced through a series of steps, including: a step of preparing a ceramic green sheet; a step of printing a conductive paste onto the ceramic green sheet in a desired pattern to form an internal electrode layer; a step of stacking many of the ceramic green sheets on which an internal electrode layer has been formed on top of one another and pressure-bonding the sheets to produce a laminate block; a step of cutting the produced laminate block to a specified size to produce an unsintered green chip; a step of sintering the green chip to obtain a chip base; a step of applying a conductive paste to both end faces of the chip base and baking the paste to form external electrodes; and a step of plating nickel, tin or other metal onto the external electrodes.

When a laminated ceramic capacitor is produced this way, however, it is difficult to pressure-bond many ceramic green sheets in such a way that each pair of adjacent internal electrodes face each other accurately, and this gives rise to the problem of the capacitor not offering sufficiently high capacity due to inaccurate facing of internal electrodes on the adjacent ceramic green sheets.

Solutions have been proposed to address this problem, such as one described in Japanese Patent Laid-open No. 2011-23707 (Patent Literature 1) wherein a conductive paste for an internal electrode is printed over the entire surfaces, except for areas near at least one side, of a ceramic green sheet having a rough rectangular shape, to form an internal electrode, and many of these ceramic green sheets having an internal electrode formed on it are stacked on top of one another, after which high pressure is applied to pressure-bond the sheets to produce a laminate block, and the block is cut to a required size, and then a ceramic body that will form a part called a "side margin" is formed, by means of coating, etc., on both side faces of the laminate block where internal electrodes are exposed, to produce a ceramic green chip and this ceramic green chip is put through a binder removal process and then sintered to manufacture a laminated ceramic capacitor.

PATENT LITERATURES

[Patent Literature 1] Japanese Patent Laid-open No. 2011-23707

SUMMARY

However, while the laminate block has been pressure-bonded under high pressure, the ceramic body has been formed on both side faces of the laminate block only by means of coating, etc., meaning that the sintering property of the laminate block is different from that of the ceramic body (side margin), and consequently on the produced laminated ceramic capacitor, the sintered density of the ceramic body (side margin) becomes lower than the sintered density of the ceramic dielectric layer in the laminate block. Such a laminated ceramic capacitor tends to let water enter from its side margins. One problem is that water entering the capacitor reduces the insulation resistance and reliability.

Also, another problem is that such a laminated ceramic capacitor is vulnerable to cracks that are caused by stress generated when, for example, the laminated ceramic capacitor is mounted on a board in a high-temperature atmosphere by means of solder reflow, because the thermal expansion coefficient of the metal forming the internal electrodes is different from the thermal expansion coefficient of the ceramic body.

In light of the above, the object of the present invention is to provide a laminated ceramic capacitor offering improved strength and moisture resistance and being capable of effectively preventing generation of cracks caused by thermal shock, by producing such a laminated ceramic capacitor by first forming a ceramic body on both side faces of a laminate block where internal electrodes are exposed to produce a ceramic green chip, and then putting the ceramic green chip through a binder removal process.

After carrying out many studies in earnest to achieve the aforementioned object of the present invention, the inventor of the present invention found that a laminated ceramic capacitor offering improved moisture resistance and being capable of effectively preventing generation of cracks caused by thermal shock could be produced by constituting a ceramic body, which is to be formed on both side faces of a laminate block where internal electrodes are exposed, using dielectric grains whose grain size is smaller than the grain size of the dielectric grains constituting the ceramic dielectric layer in the laminate block.

The present invention is based on the aforementioned discovery and, according to the present invention, the aforementioned object of the present invention can be achieved by a laminated ceramic capacitor, comprising: a laminate block made of alternately stacked ceramic dielectric layers and internal electrodes; a pair of cover layers laminated on top and bottom of the laminate block; ceramic bodies formed on both side faces of the laminate block; and a pair of external electrodes that are electrically connected to the internal electrodes; wherein such laminated ceramic capacitor is characterized in that the average grain size of the ceramic dielectric grains constituting the ceramic body is smaller than the average grain size of the ceramic dielectric grains constituting the ceramic dielectric layer in the laminate block.

Under the present invention, preferably the average grain size of the ceramic dielectric grains constituting the ceramic body should be 0.10 µm to 0.20 µm. If the average grain size of the ceramic dielectric grains constituting the ceramic body is less than 0.10 µm, ceramic dielectric grains bond with one another when sintered and consequently ceramic dielectric grains of large grain sizes may be produced, which is undesirable because the effects achieved by keeping the grain size of the ceramic dielectric grains constituting the ceramic body smaller than the grain size of the ceramic dielectric grains constituting the ceramic dielectric layer cannot be fully realized.

According to the studies conducted by the inventor of the present invention, in the present invention the moisture resistance of the laminated ceramic capacitor can be improved because the ceramic body formed on both side faces of the laminate block where internal electrodes are exposed is constituted by a ceramic dielectric body whose grain size is smaller than the grain size of the ceramic dielectric grains constituting the ceramic dielectric layer in the laminate block, thereby improving the sintered density of the ceramic body to a sufficient degree without applying pressure-bonding under high pressure and consequently preventing water from entering the laminated ceramic capacitor through the ceramic body. Additionally, it was found that when the laminated ceramic capacitor is mounted on a board by means of solder reflow, generation of cracks in the laminated ceramic capacitor can be effectively prevented even when the laminated ceramic capacitor is left in a high-temperature atmosphere for several minutes and receives thermal shocks.

According to the present invention, a laminated ceramic capacitor offering improved sintered density and moisture resistance and being capable of effectively preventing generation of cracks caused by thermal shock can be provided.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

Figure 1:
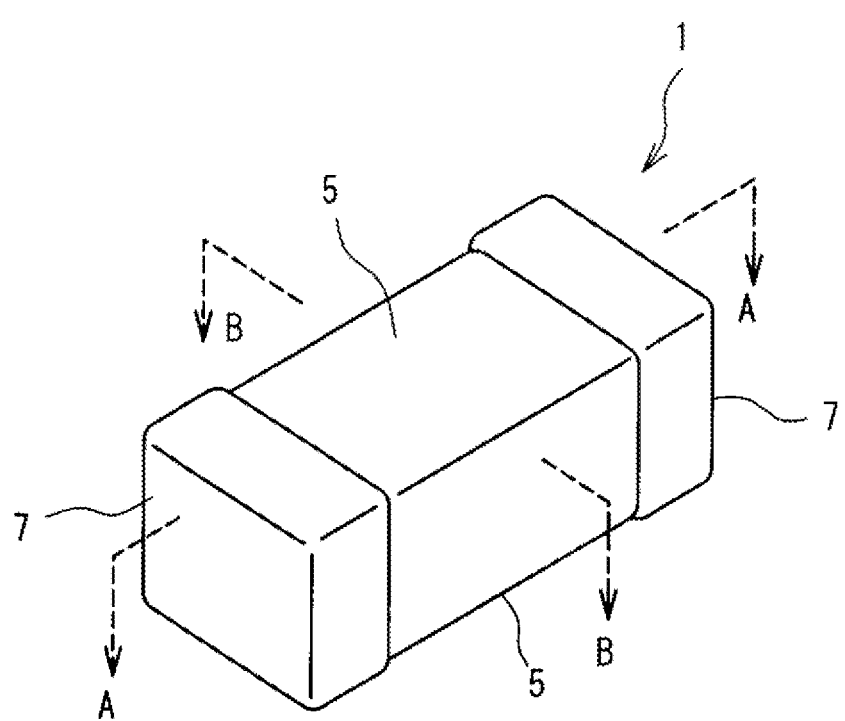
FIG. 1 is a schematic perspective view of a laminated ceramic capacitor according to a favorable embodiment of the present invention.

1 Laminated ceramic capacitor
2 Ceramic dielectric layer
3 Internal electrode
4 Laminate block
5 Cover layer
6 Ceramic body
7 External electrode

DETAILED DESCRIPTION

Figure 2:
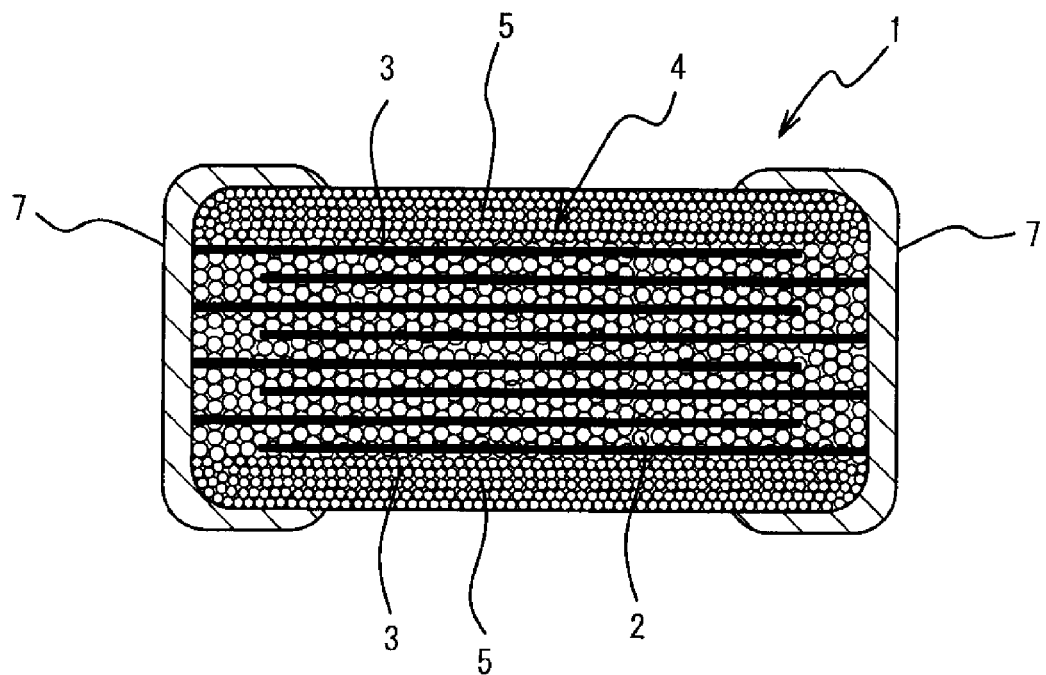
FIG. 2 is a schematic section view of the laminated ceramic capacitor in FIG. 1, cut along line A-A.
Figure 3:
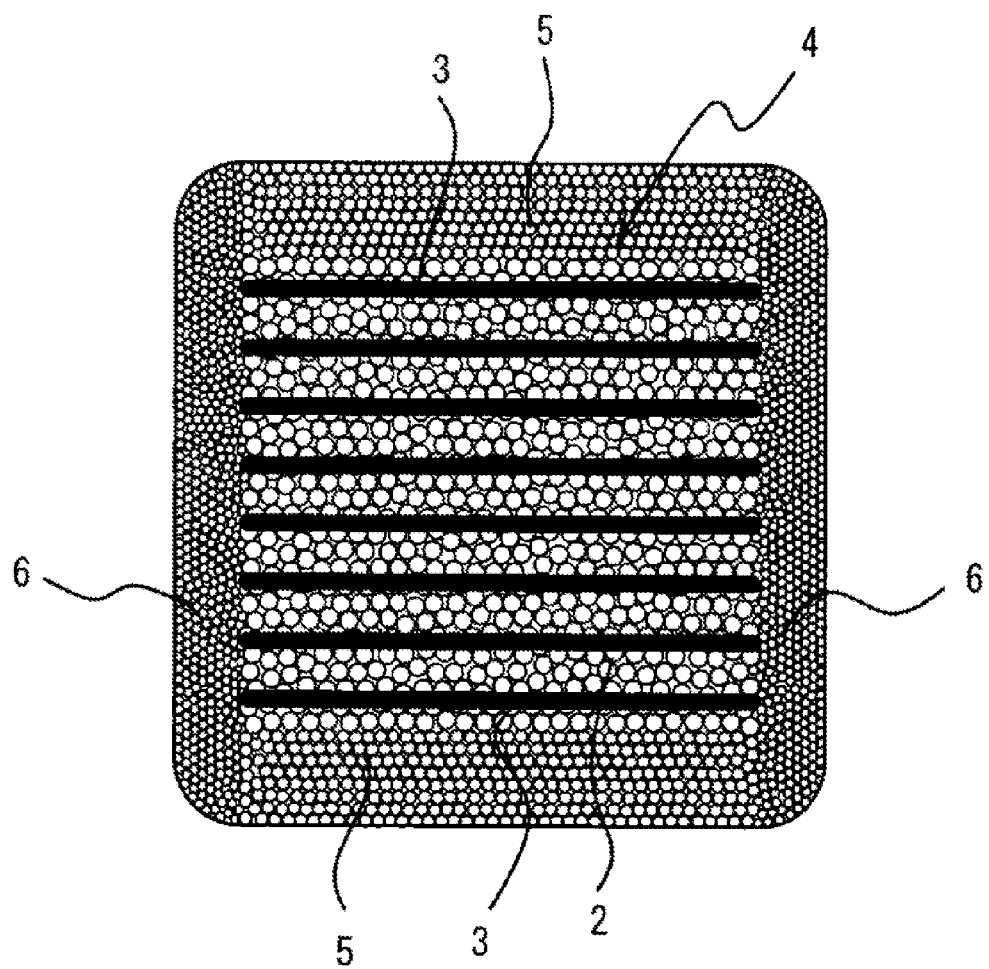
FIG. 3 is a schematic section view of the laminated ceramic capacitor in FIG. 1, cut along line B-B.

FIG. 1 is a schematic cross-section view of a laminated ceramic capacitor according to a favorable embodiment of the present invention, while FIG. 2 is a schematic section view of this laminated ceramic capacitor cut along line A-A, and FIG. 3 is a schematic section view of the same laminated ceramic capacitor cut along line B-B.

As shown in FIGS. 1 to 3, the laminated ceramic capacitor 1 according to a favorable embodiment of the present invention has a laminate block 4 made of alternately laminated ceramic dielectric layers 2 and internal electrodes 3, a pair of cover layers 5, 5 laminated on top and bottom of the laminate block 4, ceramic bodies 6, 6 formed on both side faces of the laminate block 4, and a pair of external electrodes 7, 7 that are electrically connected to the internal electrodes 3.

According to this embodiment, as shown in FIG. 3, the ceramic bodies 6, 6 formed on both side faces of the laminate block 4 are formed by ceramic dielectric grains whose average grain size is smaller than that of the ceramic dielectric grains constituting the ceramic dielectric layer 2 in the laminate block 4.

According to the studies conducted by the inventor of the present invention, such laminated ceramic capacitor whose ceramic bodies 6, 6 formed on both side faces of the laminate block 4 are formed by ceramic dielectric grains whose average grain size is smaller than that of the ceramic dielectric grains constituting the ceramic dielectric layer 2 in the laminate block 4, has been shown to demonstrate improved sintered density and moisture resistance and also effectively prevents generation of cracks even when thermal shocks are received. Here, "average grain size" refers to an average of grain sizes measured on 100 grains randomly selected from among the grains that are observed in an enlarged image of a cross section of the laminated ceramic capacitor taken by a SEM (scanning electron microscope) or an equivalent value of grain size such as d50 (median) by volume standard.

In some embodiments, the average grain size of the ceramic dielectric grains constituting the ceramic body is about 0.05 μm to about 0.30 μm, preferably about 0.10 μm to about 0.20 μm, whereas the average grain size of the ceramic dielectric grains constituting the ceramic dielectric layer is about 0.10 μm to about 0.50 μm, preferably about 0.20 μm to about 0.30 μm, wherein the average grain size of the ceramic dielectric grains constituting the ceramic body is substantially smaller than that of the ceramic dielectric grains constituting the ceramic dielectric layer by, e.g., about 5% to 80%, preferably 10% to 60%. In some embodiments, the average grain size of the ceramic dielectric grains constituting the cover layer is substantially the same as or smaller (by, e.g., about 3% to 40%) than that of the ceramic dielectric grains constituting the ceramic dielectric layer, and substantially the same as or larger (by, e.g., about 3% to 40%) than that of the ceramic dielectric grains constituting the ceramic body. In some embodiments, the ceramic dielectric grains constituting the ceramic dielectric layer, the ceramic body, and the cover layer can be of the same type (substantially the same compositions), similar types (e.g., substantially the same elements with different contents), or different types (e.g., substantially different elements). Usable ceramic dielectric grains may be $BaTiO_3$, $Ba_{1-x}Ca_xTiO_3$, $BaTi_{1-y}Zr_yO_3$, or the like. In some embodiments, the ceramic bodies fully cover and contact both longitudinal sides (left and right sides) of the laminate block where the layers of internal electrodes are exposed, wherein the top and bottom sides of the laminate block are covered by and in contact with the cover layers, and the front and rear sides of the laminate block are covered by and in contact with the external electrodes.

According to this embodiment, the cover layer 5 is also formed by ceramic dielectric grains whose average grain size is smaller than that of the ceramic dielectric grains constituting the ceramic dielectric layer 2 in the laminate block 4. That is, since the cover layer 5 undergoes a pressure-bonding process, the average grain size of its ceramic dielectric grains may be roughly the same as the average grain size of the ceramic dielectric grains in the laminate block 4; however, the cover layer 5 can be formed by these ceramic dielectric grains of a smaller average grain size to improve the moisture resistance of the laminated ceramic capacitor.

EXAMPLES

Examples and comparative examples are given below to explain the operation and effects of the present invention more clearly.

Example 1

A ceramic green sheet constituted by a dielectric material of 0.225 μm in average grain size whose main ingredient is $BaTiO_3$, and a binder, was prepared, and a Ni conductive paste was applied onto this sheet by means of screen printing, to form band-shaped paste films arranged at a specified pitch. A plurality of printed ceramic green sheets were prepared and stacked on top of one another in such a way that the band-shaped paste films were overlapped in a manner offset by one-half pattern. A ceramic green sheet on which a conductive paste had not been printed was placed as a cover layer on top and bottom of the stacked ceramic green sheets. This stack of ceramic green sheets was pressure-bonded and cut to a specified chip size to obtain an unsintered laminate block having a pair of cover layers. A ceramic paste constituted by a dielectric material of 0.200 μm in average grain size and a binder, was applied to both side faces of this laminate block, to form ceramic bodies. Next, a conductive paste for external electrodes was applied to both end faces of the laminate block on which ceramic bodies had been formed, and then the laminate block was sintered in a reducing atmosphere of 1200° C., to obtain a laminated ceramic capacitor having a pair of external electrodes that are electrically connected to internal electrodes.

One hundred units of the laminated ceramic capacitor obtained as above were prepared as laminated ceramic capacitor samples #1, and soaked for 3 seconds in a molten solder of 400° C. to check if cracks were generated. As a result, none of the laminated ceramic capacitor samples #1 generated cracks.

Example 2

A total of 100 laminated ceramic capacitor samples #2 were produced in the same manner as in Example 1, except that the ceramic bodies were formed using a ceramic paste constituted by a dielectric material of 0.170 μm in average grain size and a binder.

The laminated ceramic capacitor samples #2 produced as above were soaked for 3 seconds in a molten solder of 400° C. to check if cracks were generated. As a result, none of the laminated ceramic capacitor samples #2 generated cracks.

Example 3

A total of 100 laminated ceramic capacitor samples #3 were produced in the same manner as in Example 1, except that the ceramic bodies were formed using a ceramic paste constituted by a dielectric material of 0.135 μm in average grain size and a binder.

The laminated ceramic capacitor samples #3 produced as above were soaked for 3 seconds in a molten solder of 400° C. to check if cracks were generated. As a result, none of the laminated ceramic capacitor samples #3 generated cracks.

Example 4

A total of 100 laminated ceramic capacitor samples #4 were produced in the same manner as in Example 1, except that the ceramic bodies were formed using a ceramic paste constituted by a dielectric material of 0.100 μm in average grain size and a binder.

The laminated ceramic capacitor samples #4 produced as above were soaked for 3 seconds in a molten solder of 400° C. to check if cracks were generated. As a result, none of the laminated ceramic capacitor samples #4 generated cracks.

Comparative Example 1

A total of 100 laminated ceramic capacitor comparison samples #1 were produced in the same manner as in Example 1, except that the ceramic bodies were formed using a ceramic paste constituted by a dielectric material of 0.230 μm in average grain size and a binder.

The laminated ceramic capacitor comparison samples #1 produced as above were soaked for 3 seconds in a molten solder of 400° C. to check if cracks were generated. As a result, one of the 100 laminated ceramic capacitor comparison samples #1 generated cracks.

Comparative Example 2

A total of 100 laminated ceramic capacitor comparison samples #2 were produced in the same manner as in Example 1, except that the ceramic bodies were formed using a ceramic paste constituted by a dielectric material of 0.250 μm in average grain size and a binder.

The laminated ceramic capacitor comparison samples #2 produced as above were soaked for 3 seconds in a molten solder of 400° C. to check if cracks were generated. As a result, five of the 100 laminated ceramic capacitor comparison samples #2 generated cracks.

From Examples 1 to 4 and Comparative Examples 1 and 2, it is clear that a laminated ceramic capacitor whose ceramic bodies are formed by ceramic dielectric grains whose average grain size is smaller than that of the ceramic dielectric grains constituting the ceramic dielectric layer in the laminate block can effectively prevent generation of cracks caused by thermal shock.

The present invention is not limited by the aforementioned embodiments in any way and a range of variations are possible within the scope of the invention as presented in the Claims and it goes without saying that these variations are also considered a part of the present invention.

For example, in the examples mentioned above the conductive paste for external electrodes was applied to the unsintered laminate block and the external electrodes were formed simultaneously when the ceramic laminate was sintered. However, the external electrodes may be formed by applying the conductive paste after sintering the laminate block and baking the paste.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. In this disclosure, any defined meanings do not necessarily exclude ordinary and customary meanings in some embodiments. Also, in this disclosure, "the invention" or "the present invention" refers to one or more of the embodiments or aspects explicitly, necessarily, or inherently disclosed herein.

The present application claims priority to Japanese Patent Application No. 2011-092111, filed Apr. 18, 2011, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

I claim:
1. A laminated ceramic capacitor, comprising:
   a laminate block made of alternately stacked and pressure-bonded ceramic dielectric layers and internal electrodes and having a top and bottom with respect to the stacking direction, two side faces opposite to each other from which layers of the internal electrodes are exposed, and a front and rear from which layers of the internal electrodes are exposed;

a pair of cover layers placed on the top and bottom of the laminate block;

non-pressure-bonded ceramic bodies formed on both entire side faces of the laminate block; and a pair of external electrodes that are electrically connected to the internal electrodes at the front and rear of the laminate block;

said laminate block, cover layers, and ceramic bodies being integrated and simultaneously sintered, wherein the average grain size of ceramic dielectric grains constituting the ceramic bodies is smaller than the average grain size of ceramic dielectric grains constituting the ceramic dielectric layers in the laminate block, said ceramic bodies having a sintered density lower than that of the ceramic dielectric layers.

2. A laminated ceramic capacitor according to claim 1, wherein the average grain size of the ceramic dielectric grains constituting the ceramic bodies is 0.10 μm to 0.20 μm.

3. A laminated ceramic capacitor according to claim 1, wherein the stacked ceramic dielectric layers with the internal electrodes and the cover layers are pressure-bonded, and the ceramic bodies are coated layers applied on the side faces.

4. A laminated ceramic capacitor according to claim 1, wherein the average grain size of ceramic dielectric grains constituting the ceramic bodies is smaller than the average grain size of ceramic dielectric grains constituting the ceramic dielectric layers in the laminate block by 10% to 60%.

5. A laminated ceramic capacitor according to claim 1, wherein the average grain size of ceramic dielectric grains constituting the cover layers is smaller than the average grain size of ceramic dielectric grains constituting the ceramic dielectric layers, but larger than the average grain size of ceramic dielectric grains constituting the ceramic bodies.

* * * * *